Sept. 26, 1961  R. A. SAUNDERS ET AL  3,001,745
AUTOMATIC SHUT-OFF VALVES

Filed Dec. 23, 1957  2 Sheets-Sheet 2

Inventors:
Donald Alexander Saunders
Anthony Thomas Frederic Simmons
Reginald John Victor Snell
By Stevens, Davis, Miller & Mosher
Attorneys United States Patent Office 3,001,745
Patented Sept. 26, 1961

3,001,745
AUTOMATIC SHUT-OFF VALVES
Ronald Alexander Saunders, Penwortham, near Preston, Anthony Thomas Frederic Simmons, Preston, and Reginald John Victor Snell, Farnworth, England, assignors to The English Electric Company Limited, London, England, a British company
Filed Dec. 23, 1957, Ser. No. 704,610
Claims priority, application Great Britain Mar. 6, 1957
1 Claim. (Cl. 244—117)

The subject of the present invention is a shut-off valve for ram air supplied to aircraft which valve has interconnected control means responsive to ram air temperature and to ram air pressure, respectively, and automatically shutting off the ram air when the latter exceeds a predetermined temperature, say of 60° C.

Aircraft capable of supersonic flight are for the greater part of any flight operated at subsonic speeds, where the ram air temperature is low enough to permit the direct use of ram air for the cooling of aircraft equipment. The ram air temperature rises, however, rapidly at very high speeds, and then becomes useless for the aforesaid purposes, unless special cooling arrangements were made. On the other hand the periods of such extremely high flight velocity are usually short enough to allow dispensing with the ram air supply for the aforesaid purposes altogether during these periods, so that involved and heavy cooling arrangements for the ram air can be spared.

According to a preferred embodiment of the present invention the main valve is exposed to the thrust of the ram air which biases the same towards the open position as long as a pilot valve controlled by a heat sensitive element exposed to the ram air temperature is kept closed at temperatures lower than a predetermined value, and is biased by the ram air pressure in the closing direction when the said pilot valve is automatically opened by the said heat sensitive element upon reaching or exceeding the said predetermined temperature, the said open pilot valve causing the said main valve to close by allowing ram pressure to act upon an area sufficiently large to produce a force which can overcome the ram air pressure forces that held the said main valve open.

In order that the invention may be clearly understood, an embodiment of an automatic shut-off valve according to the invention will now be described by way of example with reference to the accompanying drawing, in which.

Figure 2:
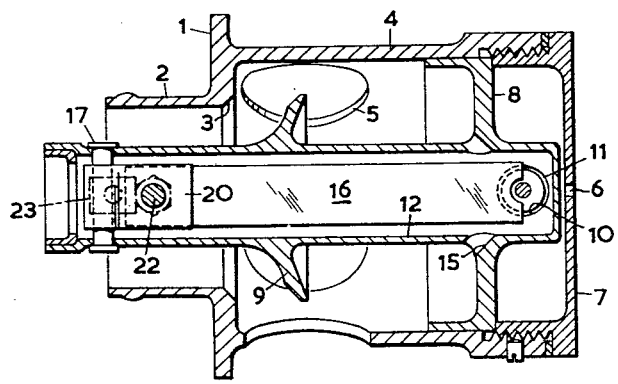
FIG. 2 is a longitudinal section on the line 2—2 of FIG. 1.
Figure 3:
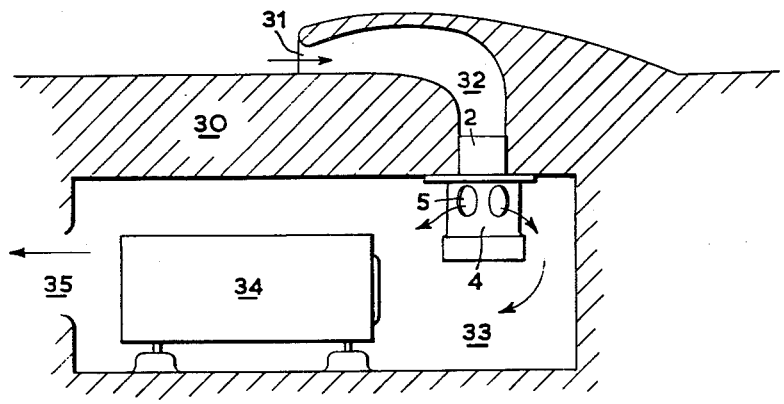
FIG. 3 is a diagrammatic section of the part of an aircraft containing a compartment to be cooled by ram air, a shut-off valve and a duct connecting said valve to a ram air intake and to said compartment, respectively.

Referring first to FIG. 3, on the outside of an aircraft fuselage 30 a ram air scoop 31 is arranged which is connected by a duct 32 to a compartment 33, containing equipment 34, such as a radio transmitter, the temperature of which has to be kept below a predetermined value. An outlet 35 from said compartment discharges the air to a zone of lower pressure. A shut-off valve to be described later in more detail with reference to FIGS. 1 and 2 has its intake 2 connected to said duct 32 and its cylinder casing 4 extending into the compartment 33, into which the lateral apertures 5 of the casing 4 discharge ram air, when said shut-off valve is open.

Figure 1:
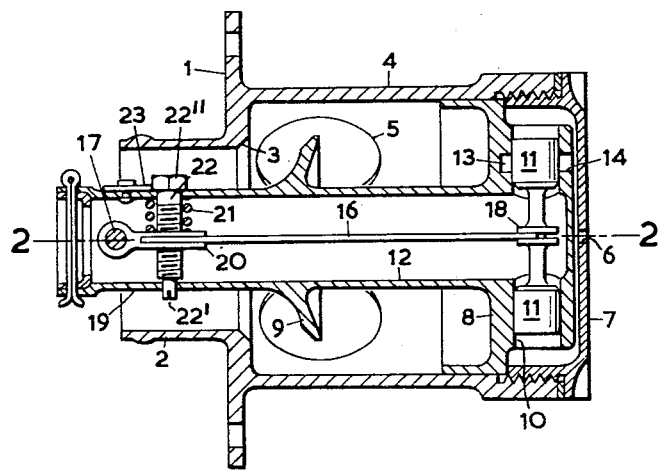
FIG. 1 is a longitudinal section of the automatic shut-off valve.

Referring now more particularly to FIGS. 1 and 2:

The valve casing 1 comprises a ram air intake 2 separated by a conical valve seat 3 from a cylinder 4 of larger internal diameter than the intake 2. This cylinder is in communication with the consumer space through large lateral apertures 5, and through a restricted orifice 6 in the bottom 7 of the cylinder. A piston 8 is movable in the cylinder 4 and is fixedly connected, for example integral with a main valve 9 co-operating with the aforesaid seat 3.

This piston 8 has a transverse bore 10 in which a symmetrical double piston valve 11 is slidable. A central bore 12 extends through the said valve 9 into the said bore 10. An annular duct 13 is closed with some overlap by one of the piston portions of the said double piston valve 11, and is in communication through a port 14 with the space of the cylinder 4 between the end face of the piston 8 and the bottom 7 of the said cylinder. A duct 15 connects the said central bore 12 with the space between the said piston 8 and the said valve seat 3 and valve 9.

The body of the valve 9 has an extension 19 projecting into the intake 2, and one end of a bimetal strip 16 is fixed to a lever 20 pivoted in said extension 19 about a pin 17 transverse to the said central bore 12. The other end of the said bimetal strip 16 engages between a double collar 18 of the said piston valve 11. The said lever 20 rests on a coiled compression spring 21 abutting on the inside of the said central bore 12.

The said bimetal strip 16 keeps the said double piston valve 11 in a position closing the annular duct 13 as long as the ram air temperature to which said strip 16 is exposed is below a predetermined value. The said bimetal strip 16 flexes in response to any change in temperature from the initial setting.

The said lever 20, to which the bimetal strip 16 is riveted, is tapered to take a screw 22. This screw 22 has plain zones which rotate in plain holes in the said extension 19, a slotted lower end 22′ and a hexagon head 22″ co-operating with a stop 23 riveted to the extension 19. By turning the screw 22 the lever 20 is raised or lowered so as to set the operating temperature of the piston valve 11. Once set, the lever 20 is held in a fixed position by the action of spring 21 which pushes the lever 20 downwards until the head 22″ of the said screw 22 rests on the surface of the extension 19. This screw 22 is then prevented from rotating by the said stop 23.

To turn the screw 22, a screwdriver is inserted in the slotted lower end 22′ of the screw 22. Pushing upwards with the screwdriver raises the head 22″ of the screw 22 above the fixed stop 23, and the screw 22 can then be rotated. A hexagon head is used on screw 22 so that any rotation from a ⅙ of a turn upwards can be made. On withdrawal of the screwdriver the spring 21 pulls the head 22″ of the screw 22 down onto the surface of extension 19, and the screw 22 is locked in a new position together with lever 20.

Normally the lever 20 will stay in this new position. If, however, a large temperature drop is encountered by the bimetal strip 16, it will flex downward until it touches the side of the said bore 12. If any further fall in temperature occurs, the tip of the bimetal strip can no longer deflect and it would begin to arch. If the fixing were "encastre," bending moments would build up at the fixing, and eventually the strip would fail and become permanently distorted. However, the lever 20 is pivoted at 17 and is normally fixed "encastre" by the action of the spring. As the bimetal strip-forces build up after the strip 16 has touched the inside of bore 12, the upward reaction at the spring 21 will overcome the spring loading and permit the strip 16 to deflect with an upward movement of the screw 22.

By using a soft spring 21, the vertical reaction at screw 22 is limited to about its initial preloading, and the maximum bending moment and bending stress remain at about the values they had when the spring first yielded. By suitable choice of dimensions and spring pre-loading it can thus be ensured that no failure of the bimetal strip 16 occurs.

The fixed stop 23 on top of extension 19 is made thick enough that the screw 22 does not ride upward out of locking engagement with it when the bimetal strip is at minimum temperature.

In the position as shown in the drawing, the valve 9 is in the fully open position, the consumer pressure acting on both sides of the piston 8 through the apertures 5 and orifice 6.

Increase in ram air temperature flexes the bimetal strip 16 upwards. On reaching or exceeding a predetermined ram air temperature the lift of the bimetal 16 causes the piston valve 11 to uncover the annular port 13 thereby admitting air from the ram air pressure source via the longitudinal bore 12 into the chamber formed between piston 8 and the cylinder end 7.

The pressure in the latter chamber depends upon the relative flow areas of orifice 6 in the cylinder end 7 and the port area formed between piston valve 11 and the annular duct 13; the greater the port area, the nearer the chamber pressure to ram air pressure. Therefore as the ram air temperature continues to rise above the predetermined value, so the bimetal lift increases and the pressure within the said chamber rises towards the ram air pressure value.

Ultimately the pressure will rise until the force produced on the full area of piston 8 over-rides the combined forces which held the valve 9 open (i.e. the ram pressure acting on the valve area 9 and the internal pressure on the annular area of the opposite face of piston 8), thereby closing the valve.

A small bleed of ram air through the bores 15 into the interior of the cylinder 4 on the left hand side (FIG. 1) of the piston 8, gives rapid response to ram temperature at the bimetal strip 16.

When upon reduction in flying speed the bimetal strip 16 is straightening out owing to a drop in ram air temperature, the double piston valve 11 is restored to the position shown in FIG. 1.

The pressure on the back face of piston 8 is determined by the orifice 6 and the position of piston valve 11. The pressure on the front face of piston 8 will be equal to that in the compartment being cooled, i.e. ambient static pressure, or nearly so.

The application of the valve is to prevent exposure of items of aircraft equipment to high air temperatures when these are fed with air from ram intakes. Its use is therefore limited to cooling of equipment in short duration supersonic aircraft where the equipment has a moderate thermal lag and a limiting temperature below the maximum stagnation temperature.

The primary use of the invention is the cooling of heat producing electrical equipment. The invention could be used in a number of ways, e.g.:

(i) To cut off the supply of ram air to an item of equipment at say 60° C. ram temperature, thus leaving the unit without cooling air during the short high speed run. This is a method of cooling suitable for items having fairly high thermal capacity.

(ii) As a means of augmenting the cooling available for an item which is being supplied from a cold air unit (expansion turbine). While the flow of air from the cold air unit might be sufficient at high aircraft speed, it will diminish as the aircraft slows and might then become inadequate. At the low speed, then, the ram air valve would open and augment the flow from the cold air unit. This is a method of cooling suitable for items with low thermal capacity, and avoids the use of a very large cold air unit simply to cover low speed flying.

(iii) As a means of preventing not only admission of high ram temperature air to equipment but also of very low temperature air.

What we claim as our invention and desire to secure by Letters Patent is:

In an aircraft capable of supersonic flight but having subsonic normal climbing and cruising speed, a shut-off valve arrangement controlling the supply of ram air to equipment of the said aircraft requiring a working temperature below a predetermined maximum for continuous operation, comprising in combination: an intake duct in operation scooping up ram air, an air delivery duct connecting the said arrangement to the said equipment, a cylinder closed at the rear end and connected between the said ducts at the front end, a main valve arranged between the said intake duct and the said cylinder isolating the same from one another in the closing position, a piston of an area larger than the effective area of the said main valve fixedly connected to the said valve and slidable in the said cylinder, a heat-sensitive element arranged in the said intake exposed to ram air temperature, a pilot valve arranged in the said piston operatively connected to the said heat sensitive element and controlling a pilot duct arranged in the said piston in the sense of, when open, connecting both ends of the said cylinder with one another, the said pilot valve being kept in the closed position by the said heat-sensitive element below the said predetermined maximum temperature at ram air temperatures corresponding to subsonic speeds and the said main valve being biased by the ram air pressure acting on its effective area from the side of said air intake into the open position and the said pilot valve being opened by the thermal expansion of the said heat-sensitive element above the said maximum temperature at ram air temperatures corresponding to supersonic speeds, exposing the rear face of the said piston of an area exceeding the said effective area of the main valve to ram air pressure in the sense of closing the said main valve, thus exposing the said equipment to cooling ram air scooped up at subsonic speeds and automatically shutting off the ingress of ram air at periods of supersonic speed when the ram air would have an adverse temperature effect on the said equipment.

References Cited in the file of this patent

UNITED STATES PATENTS

| | | |
|---|---|---|
| 668,766 | Bickel | Feb. 26, 1901 |
| 2,200,318 | Yonkers | May 14, 1940 |
| 2,466,779 | Pevney | Apr. 12, 1949 |
| 2,940,258 | Lombard et al. | June 14, 1960 |